US012462089B1

(12) United States Patent
Botha et al.

(10) Patent No.: US 12,462,089 B1
(45) Date of Patent: Nov. 4, 2025

(54) DYNAMIC VISUAL CODING OF TEMPORAL, GEOGRAPHY AND ACTIVITY DRIVEN USER INTERFACES

(71) Applicant: All Turtles Corporation, Bentonville, AR (US)

(72) Inventors: Dala Botha, Corvallis, OR (US); Phil Libin, Bentonville, AR (US)

(73) Assignee: All Turtles Corporation, Bentonville, AR (US)

( * ) Notice: Subject to any disclaimer, the term of this patent is extended or adjusted under 35 U.S.C. 154(b) by 263 days.

(21) Appl. No.: 18/142,169

(22) Filed: May 2, 2023

Related U.S. Application Data

(60) Provisional application No. 63/337,630, filed on May 3, 2022.

(51) Int. Cl.
| | |
|---|---|
| *G06F 40/103* | (2020.01) |
| *G06F 3/01* | (2006.01) |
| *G06F 40/197* | (2020.01) |
| *G06T 11/00* | (2006.01) |
| *G06V 40/16* | (2022.01) |

(52) U.S. Cl.
CPC ............ *G06F 40/103* (2020.01); *G06F 3/012* (2013.01); *G06F 40/197* (2020.01); *G06T 11/001* (2013.01); *G06V 40/176* (2022.01); *G06F 2203/011* (2013.01); *G06T 2200/24* (2013.01)

(58) Field of Classification Search
CPC ...... G06F 40/103; G06F 3/012; G06F 40/197; G06F 2203/011; G06T 11/001; G06T 2200/24; G06V 40/176
See application file for complete search history.

(56) References Cited

U.S. PATENT DOCUMENTS

| | | | |
|---|---|---|---|
| 2003/0016241 A1* | 1/2003 | Burke ................... | G06F 16/958 707/E17.116 |
| 2009/0106257 A1* | 4/2009 | Iskold ................... | G06F 16/958 |
| 2012/0010995 A1* | 1/2012 | Skirpa ................. | G06F 16/9577 705/14.49 |

\* cited by examiner

*Primary Examiner* — Phuong H Nguyen
(74) *Attorney, Agent, or Firm* — Westborough IP Group, LLC

(57) ABSTRACT

Enhancing interactivity of a user with a portion of a web page includes providing visual codes for some items on the web page that are part of the portion of the web page. Each of the visual codes corresponds to temporal, geographical, content, activity, and/or behavior attributes of the at least some items. Enhancing interactivity also includes providing a user-actuatable mechanism on the web page to capture the portion of the web page and to create a visual code shortcut for each of the visual codes corresponding to the portion of the web page and storing the portion of the web page. The portion is stored in a repository that is indexed according to the visual code shortcuts. The portion of the web page is retrievable from the repository at a later time by accessing the visual code shortcuts. The portion of the web page may be a news page.

26 Claims, 13 Drawing Sheets

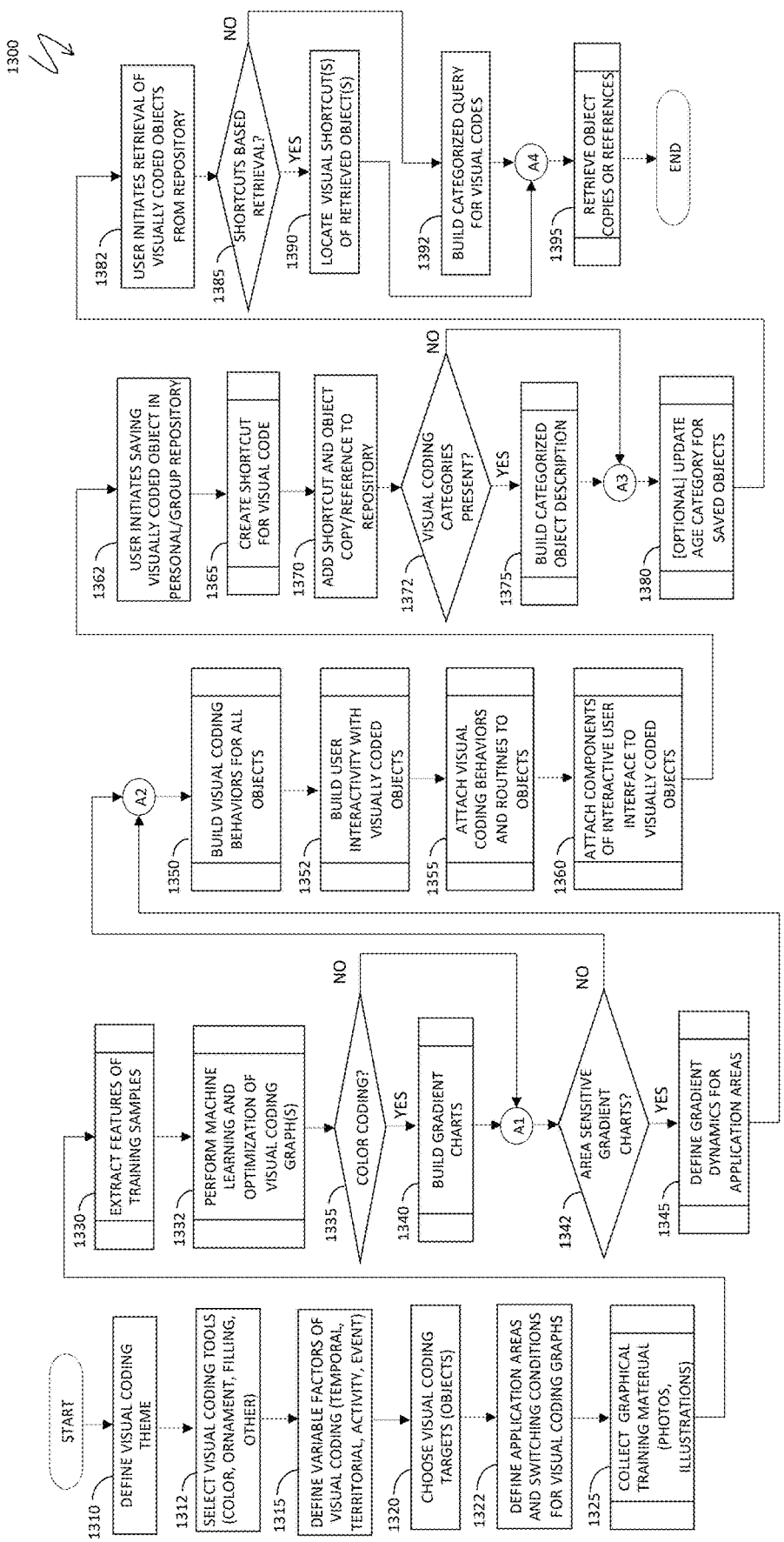
FIG. 13. System flow diagram

DYNAMIC VISUAL CODING OF TEMPORAL, GEOGRAPHY AND ACTIVITY DRIVEN USER INTERFACES

CROSS-REFERENCE TO RELATED APPLICATIONS

This application claims priority to U.S. Prov. App. No. 63/337,630, filed on May 3, 2022, and entitled "DYNAMIC VISUAL CODING OF TEMPORAL, GEOGRAPHY AND ACTIVITY DRIVEN USER INTERFACES", which is incorporated herein by reference.

TECHNICAL FIELD

This application is directed to the field of information processing and user interfaces, and more particularly to the field of dynamic visual coding using colors, textures, ornaments, and other visual means of various characteristics of temporal, geography and activity driven user interfaces.

BACKGROUND OF THE INVENTION

Internet, its mobile instances, and mobile applications have long become the main hubs of information access, communications, commerce, and productivity for the contemporary society. According to industry statistics, there are currently 5.1 billion internet users, 7.26 billion mobile users and 4.3 billion active mobile internet users on the planet. The total number of active websites, permanently accessible by the worldwide audience, exceeds 400 million (out of the 1.6-1.9 billion existing websites). The number of social media users is expected to exceed 4.4 billion by 2025, while the number of email users will grow to 4.6 billion by the same year, while the number of worldwide ecommerce shoppers has reached, by some estimates, 3.8 billion users.

The increasing volume and complexity of information and workflows, multiplied by the multimedia diversity and complex behaviors of modern websites and web-based software applications, including the extensive use of long-form media, audio and video, dynamic and adaptive content, are causing undesirable effects upon the worldwide web audience, such as information overload, and are putting additional emphasis on the web and application design requirements, especially on the UX/UI (User Experiences and User Interface) aspects of design. Not surprisingly, the web design software market alone is projected to grow at the average annual rate of 9.4% and reach $13.4 billion by 2027, measured by the summary value of the website builder software, such as Wix and Squarespace, and the Content Management Systems (CMS), such as WordPress, Joomla, Drupal, etc.

Recent trends in web and application design underscored the use of secondary notation, broadly defined as a set of visual cues aiming at improving the readability of the formal, primary notation, facilitating the understanding of web and application content, its processing, and memorizing by users. Secondary notation may manifest itself through different flavors, depending on the nature of the primary notation; the secondary notation may be different, for example, for a snippet of computer source code vs. a flowchart or other graphical/multimedia content. A source code may use text indentation, other layout features, font style, color, and format to emphasize portions of the text; in contrast, a flowchart design may accentuate a logical information flow, clean non-intersecting connections, adequate shapes, spatial arrangement, color of flowchart entries, and other geometric and shape formatting means to increase content understandability.

Color coding is a ubiquitous method of the secondary notation utilizing the traffic light metaphor in physical and electronic worlds (exit signs, no-entry, danger warnings), flag and semaphore long-distance communications, the 25-pair color code in communications and other electrical wiring markings, health and magic points in video games, color-coded alerts in public warnings, black/white/gray hat social functions, karate belts, and numerous other applications. Many popular application suites and online services developed across numerous application areas from productivity to social networks to entertainment to vertical applications, include color coding conventions at various levels of user interface and application functioning, facilitating software use and supporting key application workflows. In addition to color coding, textures, ornaments, and other visual means are also finding extensive uses in real-life and virtual processes.

SUMMARY OF THE INVENTION

Notwithstanding a significant progress in color coding and other methods of secondary notations, the existing techniques do not represent a systematic approach to user interface design: the existing techniques are offering, for the most part, static solutions; the existing techniques do not consider user feedback and do not include advanced interactivity; the existing approaches do not rely sufficiently on the color memory of users, and fail to address many design needs, such as facilitating comprehension of highly dynamic content, adequately adapting to temporal and geographical factors, providing adequate use of gradient colors, textures, and other ornamental solutions, do not support some important user workflows, etc.

Accordingly, it is important to develop techniques and systems for dynamic visual coding of temporal, geography, and activity driven user interfaces responsive to user feedback.

According to the system described herein, enhancing interactivity of a user with at least a portion of a web page includes providing one or more visual codes for at least some items on the web page that are part of the portion of the web page, each of the visual codes corresponding to temporal, geographical, content, activity, and/or behavior attributes of the at least some items, providing a user-actuatable mechanism on the web page to capture the portion of the web page and to create a visual code shortcut for each of the one or more of the visual codes corresponding to the portion of the web page, and storing the portion of the web page in response to the user actuating the user-actuatable mechanism, the portion being stored in a repository that is indexed according to the one or more visual code shortcuts, the portion of the web page being retrievable from the repository at a later time by accessing at least one of the one or more visual code shortcuts. The at least a portion of the web page may be a news page. The news page may display a collection of news items and include a search bar, a visually coded logo, and a title. The visual codes may be color codes that correspond to temporal information about the news page, territorial information corresponding to the news page, and/or content information corresponding to the news page. At least some of the items may include photographs that are categorized by temporal attributes, geographic attributes and/or territorial attributes. Color sets may be extracted from the photographs to form a training sample for a machine learning component and an optimization component that provide an optimal series of geotemporal color schemes for visual coding. The user may provide additional searchable information to be stored with the one or more visual code shortcuts. The visual codes may include a color scheme. The visual codes corresponding to the items of the portion of the web page that are stored may include an age attribute that changes color in response to a passage of time. The at least some of the items of the portion of the web page that are stored may be retrievable using the color scheme. At least some of the items of the portion of the web page that are stored may be indexed by one or more temporal visual code shortcuts, one or more territorial visual code shortcuts, and/or content visual code shortcuts. At least one of the items may be a company logo placed on a web page. The one or more visual codes may include changing color schemes and colors within color schemes based on a passage of time. A particular color scheme for the one or more visual codes at a particular time may be chosen based on a circular gradient sequence for visual hourly color coding. A particular color scheme for the one or more visual codes at a particular time may be chosen based on a circular gradient sequence for visual monthly color coding. A particular color scheme for the one or more visual codes may be chosen based a location corresponding to the at least some items and on a visual gradient coding for territorial objects. A plurality of visual coding alternatives may be used and changes between the plurality of the visual coding alternatives may be cyclic or acyclic. Particular ones of the changes between the plurality of the visual coding alternatives may be chosen based on switching conditions that are continuously verified. Enhancing interactivity of a user with at least a portion of a web page may also include continuously capturing a face of the user to provide video frames, streaming the video frames into a facial recognition component, the facial recognition component assessing emotional states of the user, and adjusting the one or more visual codes based on a current emotional state of the user. In response to the current emotional state of the user being slightly tired and bored, a light ornamental background may be added to a pane containing work being performed by the user. The light ornamental background may be transformed to a dense ornament as the user continues to work. Transforming the background to a denser ornament may indicate to the user that it is time to take a break from the work being performed by the user. The work being performed by the user may be halted to prevent the user from continuing. One or more scripts may be implemented using tools for memorizing and retrieving visually coded content, visual coding graphs, switching conditions used in visual coding graphs, and/or schedules used in execution and planning of visual coding schemes and associated events. The one or more scripts may be programmatically attached to at least some items on the web page and may create visual coding behaviors for the at least some items on the web page.

According further to the system described herein, a non-transitory computer readable medium contains software that enhances interactivity of a user with at least a portion of a web page. The software includes executable code that provides one or more visual codes for at least some items on the web page that are part of the portion of the web page, each of the visual codes corresponding to temporal, geographical, content, activity, and/or behavior attributes of the at least some items, executable code that provides a user-actuatable mechanism on the web page to capture the portion of the web page and to create a visual code shortcut for each of the one or more of the visual codes corresponding to the portion of the web page, and executable code that stores the portion of the web page in response to the user actuating the user-actuatable mechanism, the portion being stored in a repository that is indexed according to the one or more visual code shortcuts, the portion of the web page being retrievable from the repository at a later time by accessing at least one of the one or more visual code shortcuts. The at least a portion of the web page may be a news page. The news page may display a collection of news items and include a search bar, a visually coded logo, and a title. The visual codes may be color codes that correspond to temporal information about the news page, territorial information corresponding to the news page, and/or content information corresponding to the news page. At least some of the items may include photographs that are categorized by temporal attributes, geographic attributes and/or territorial attributes. Color sets may be extracted from the photographs to form a training sample for a machine learning component and an optimization component that provide an optimal series of geotemporal color schemes for visual coding. The user may provide additional searchable information to be stored with the one or more visual code shortcuts. The visual codes may include a color scheme. The visual codes corresponding to the items of the portion of the web page that are stored may include an age attribute that changes color in response to a passage of time. The at least some of the items of the portion of the web page that are stored may be retrievable using the color scheme. At least some of the items of the portion of the web page that are stored may be indexed by one or more temporal visual code shortcuts, one or more territorial visual code shortcuts, and/or content visual code shortcuts. At least one of the items may be a company logo placed on a web page. The one or more visual codes may include changing color schemes and colors within color schemes based on a passage of time. A particular color scheme for the one or more visual codes at a particular time may be chosen based on a circular gradient sequence for visual hourly color coding. A particular color scheme for the one or more visual codes at a particular time may be chosen based on a circular gradient sequence for visual monthly color coding. A particular color scheme for the one or more visual codes may be chosen based a location corresponding to the at least some items and on a visual gradient coding for territorial objects. A plurality of visual coding alternatives may be used and changes between the plurality of the visual coding alternatives may be cyclic or acyclic. Particular ones of the changes between the plurality of the visual coding alternatives may be chosen based on switching conditions that are continuously verified. The software may also include executable code that continuously captures a face of the user to provide video frames, executable code that streams the video frames into a facial recognition component, the facial recognition component assessing emotional states of the user, and executable code that adjusts the one or more visual codes based on a current emotional state of the user. In response to the current emotional state of the user being slightly tired and bored, a light ornamental background may be added to a pane containing work being performed by the user. The light ornamental background may be transformed to a dense ornament as the user continues to work. Transforming the background to a denser ornament may indicate to the user that it is time to take a break from the work being performed by the user. The work being performed by the user may be halted to prevent the user from continuing. One or more scripts may be implemented using tools for memorizing and retrieving visually coded content, visual coding graphs, switching conditions used in visual coding graphs, and/or schedules used in execution and planning of visual coding schemes and associated events. The one or more scripts may be programmatically attached to at least some items on the web page and may create visual coding behaviors for the at least some items on the web page.

The proposed system offers visual coding of web and application pages and parts of the pages, objects, and user interfaces. Cyclic (periodic) and acyclic visual coding sequences and graphs may be based on temporal, geographical, environmental, and other factors and on various types of activities, including activities with non-verbal user feedback. Visual coding sequences may include color, ornaments, textures, filling patterns and other graphical entities; for color coding, gradient charts of different types, including gradients with variable application areas are offered. Switching between various sequences in a visual coding graph, of attaching visual coding behaviors to web and user interface objects and of visual coding responses to non-verbal user feedback are all offered. User interactions with dynamic visually coded objects may include creating visual shortcuts, saving (remembering) visually coded objects in user repositories, and retrieval from the repositories of items found by users following memorized visual coding of individual objects and of visually coded object categories.

Various aspects of system functioning are explained as follows.

1. Visually coded objects may include portions of a web page or user interface, such as page backgrounds, logos and other graphical elements, panels, lists, tables, frames, charts, etc.
2. A temporal visual coding sequence is viewed as a sequence of graphical entities (colors, ornaments, textures, filling patterns, etc.) corresponding to a periodic time series, such as hours, months, weeks within a month or year, days of week, seasons, etc. Each time unit within a series may be assigned a permanent visual scheme (chart), such as a color, a gradient color scheme (see below) or an analogous visual scheme based on textures, filling patterns, ornaments, etc.
3. A temporal color-coding sequence may be represented by a cyclic graph where each node may be a color mark on a color wheel corresponding to a time unit and where edges connect adjacent nodes and may carry additional supplemental colors. The outcoming edge of a last node in such cyclic sequence connects the last node with the first node in the sequence, thus closing the coding sequence.

A basic example of a temporal color-coded sequence may be a company logo that changes color (or, one or several of the colors in its color palette) every hour/weekday/month.
4. Gradient color-coding sequences (temporal or other) have gradient color schemes assigned to each item in the sequence (each node of the graph). There may be different types of gradient color schemes for such sequences:
    (a) Adjacent base colors. With this color scheme, each gradient color has two components, representing the two colors of the previous and the current color marks assigned to adjacent nodes. Thus, two subsequent gradient color schemes share one mutual color, making the transition between color-coded objects smoother. Gradient type may be linear, circular, diamond, or any other gradient distribution type over the object area or surface.
    (b) Adjacent base colors with intermediate supplementary colors. In this case, a gradient color scheme is enriched with additional supplementary colors. The colors may be picked, for example, from the geometric representation of edges of the visual coding graph that are crossing and picking the supplementary color marks within the trajectory between the two base color marks.
    (c) Gradient color scheme with variable application areas. This color scheme may combine one of the previous color-coding methods with a dynamic change of color application areas. A temporal color-coding scheme may include, for example, a gradual decline of an object area (or portion of a surface) covered by the base color shared with a previous time unit and a gradual increase of areas covered by the base color assigned to the current unit (and the areas covered by intermediate colors of the gradient color scheme).
5. Examples of temporal gradient color-coding sequences:
    (i) For the gradient color schemes (a) and (b): a company logo with variable gradient colors changing each hour (every two one-hour intervals are sharing one base color).
    (ii) For the gradient color scheme (c): A company logo and a background of text panels on a company website are changing based on a monthly color-coding sequence. Each month has a base color, utilizes the base color of the previous month (January shares the color with December) and may have intermediate gradient colors;
    on the first day of each month, a base color of the previous month may occupy a half or more of an overall area size of every color-coded object, while all other colors may share the rest of the area (surface) in equal portions;
    on the last day of the month, the application area sharing may be reversed, so that the base color of the current month may occupy a major part of the area, while the application areas for the rest of the colors are shrinking.
6. Geographic visual coding may be defined as a correspondence between geographic (territorial) locations and visual schemes similarly to temporal coding. Geographic visual coding may have other properties of temporal coding sequences if visual geographic visual coding forms a cyclic series, for example, a company location panel or a navigation panel of a company website periodically scans the gradient color schemes or other visual entities reflecting domestic or worldwide locations of the company.
7. Combined geotemporal visual coding. Geographic and temporal visual coding may be combined: some objects on a website or within other user interfaces may be visually coded based on locations, while other objects may be visually coded relative to timing. For example, news items on an international news site normally have timestamps and may have indications of each a location of each item (a country, continent, or other territory). Accordingly, a background of a news snippet may be visually coded based on the timestamp (temporal visual coding), while a background of the news heading may reflect the geographic visual coding.
8. Extracting color schemes from photographs. Visual coding may be based on multiple series of relevant photographs, which represent a design theme and visual coding parameters (timing, geography, etc.). For example, a company name Sky Technologies may suggest a sky theme as a basis for visual coding of a website for Sky Technologies (or for visual coding of a user interface of a software application developed by the company). Then, for the purpose of temporal coding, an extensive collection of sky photos made at different times corresponding to a time sequence used in temporal coding (e.g., hours, months, seasons) in the territory where the company headquarters are located may be obtained and processed. Color sets for every photograph may be extracted, and the sample of retrieved color vectors may be used as an input to a machine learning and/or optimization algorithm resulting in a set of extracted color schemes best fitting the time sequence. Analogously, geographic and geotemporal visual coding may use large samples of photos taken at different territories or territories and times and similarly processed to provide color schemes for visual coding consistent with a design theme.

9. Visual coding of activities and events; user feedback. Visual coding sequences may be associated with activities conducted on a web site or in an application, driven by internal or external circumstances and including changes of object states, arrival or departure of objects, intensity of changes (for example, related to stock trading, weather, news topics, etc.). Visual coding of such activities may follow user interactions with websites and applications and utilize non-verbal cues captured, for example, by a user-facing video camera and a facial/emotion recognition system that tracks user performance and emotional state. As an example, a user may be working with an email application and the system may follow an emotional state of the user and change a visual coding scheme as signs of fatigue and decline in performance are increasingly discovered by the system. A color or ornamental coding within an email interface may be hinting users at the state of the users and suggesting taking a break in the work process.

10. Multi-component visual coding graphs. Multiple alternative or co-existing visual coding sequences may be simultaneously applied within the same user interface. For example, a regular temporal coding sequence on a company website may be replaced with an alternative sequence in case of a company conference or a major business event; analogously, the main visual coding scheme may be supplemented with a decorative coding sequence during a holiday season. The construction of such multi-component visual coding graphs may include several cyclic or acyclic visual coding sequences, connected by special edges representing switching conditions between the component sequences; switching conditions may be dynamically verified based on calendar dates, events, and other factors.

11. Attaching visual coding behaviors to user interface. Websites and software applications may invoke visual coding via a dedicated code (script) that combines visual coding graphs, switching and activating conditions, schedules, user interactivity, and other parameters. Scripts may be attaching visual coding sequences and graphs to various web and application objects.

12. User interactivity: memorizing and retrieving visually coded objects. Users (surfers, viewers, site visitors) may interact with visually coded objects in various ways. A web page may have one or more memorization (saving) buttons, touch gestures or other capturing tools accompanying visually coded objects of the web page. A web page or an application user may activate the capturing tool to memorize a visually coded object. The system may create a visual shortcut of the object that reflects the visual coding scheme; the system may additionally create visual shortcuts for object attributes (for example, temporal, geographic, content categories for a news item) and may capture the object or a reference to the object offering the user a visually coded object. If the user is identifiable by the page, site, or application—for example, if the user is subscribed to an online service associated with the page/site or is registered for an application use—the captured visually coded object may be added to a repository, associated with the user, which may be a personal or a group repository. The user may be able to retrieve objects from the repository by scanning and choosing visual shortcuts, by building and running a query based on visual shortcuts of object attributes, or by combinations of retrieving, building, and running.

BRIEF DESCRIPTION OF THE DRAWINGS

Embodiments of the system described herein will now be explained in more detail in accordance with the figures of the drawings, which are briefly described as follows.

FIG. 13 is a system flow diagram illustrating system functioning in connection with visual coding and associated user interfaces, according to an embodiment of the system described herein.

DETAILED DESCRIPTION OF VARIOUS EMBODIMENTS

The system described herein offers visual coding of web and application pages and parts of the pages, interactive objects, and user interfaces based on visual coding sequences and graphs, which may be based on temporal, geographical, environmental, and other factors and on various types of activities, and may employ colors, textures, ornaments, and other visual mechanisms.

Figure 1:
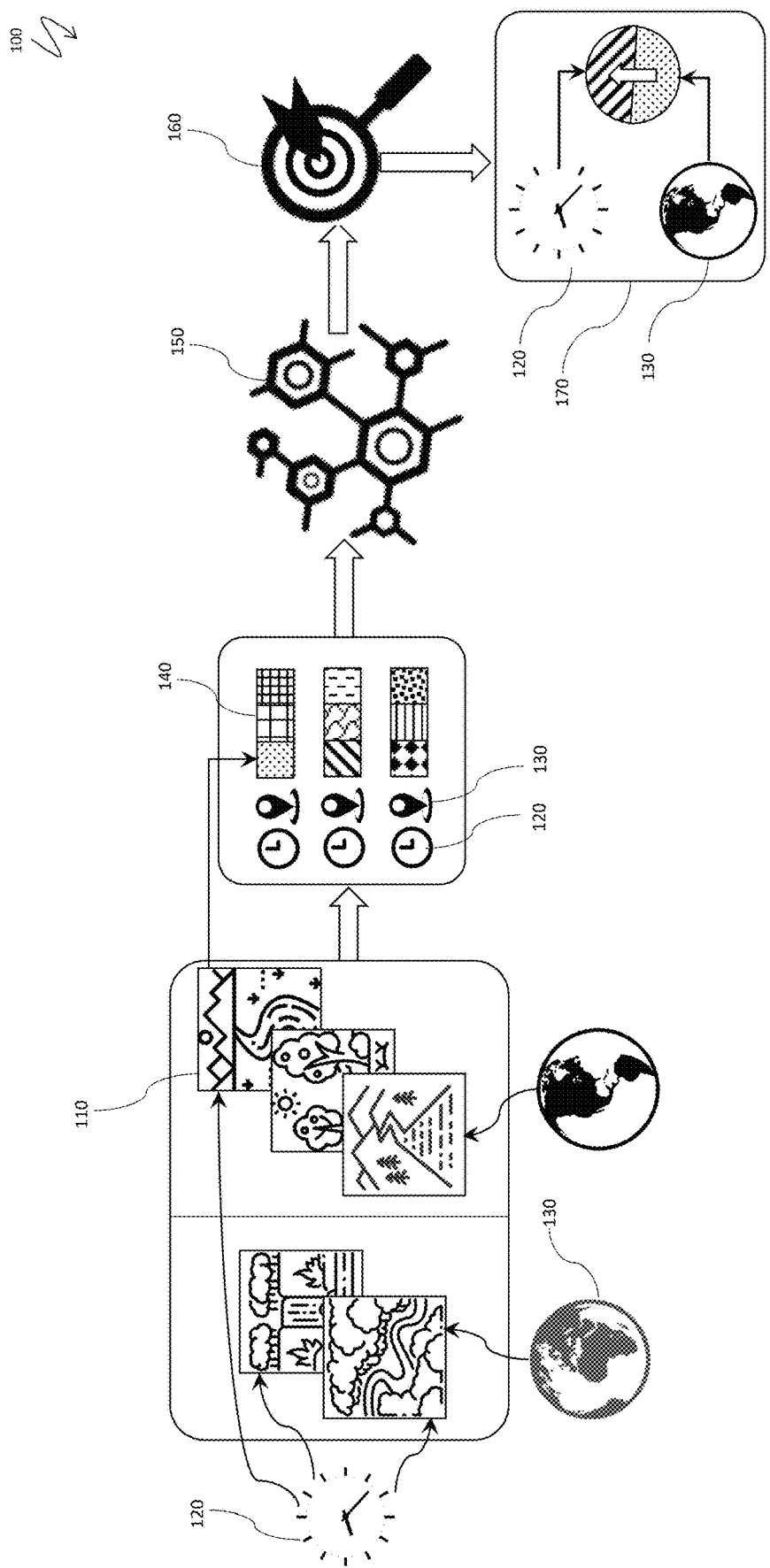
FIG. 1 is a schematic illustration of extracting visual coding schemes from photographs, according to an embodiment of the system described herein.

FIG. 1 is a schematic illustration 100 of extracting visual coding schemes from photographs. A collection 110 of photographs is categorized by temporal attributes 120, geographic and territorial attributes 130, and may be additionally categorized by other attributes. Characteristic color sets 140 are extracted from the photographs and form a training sample for a machine learning component 150 and an optimization component 160, resulting in an optimal series of geotemporal visual coding schemes 170.

Figure 2:
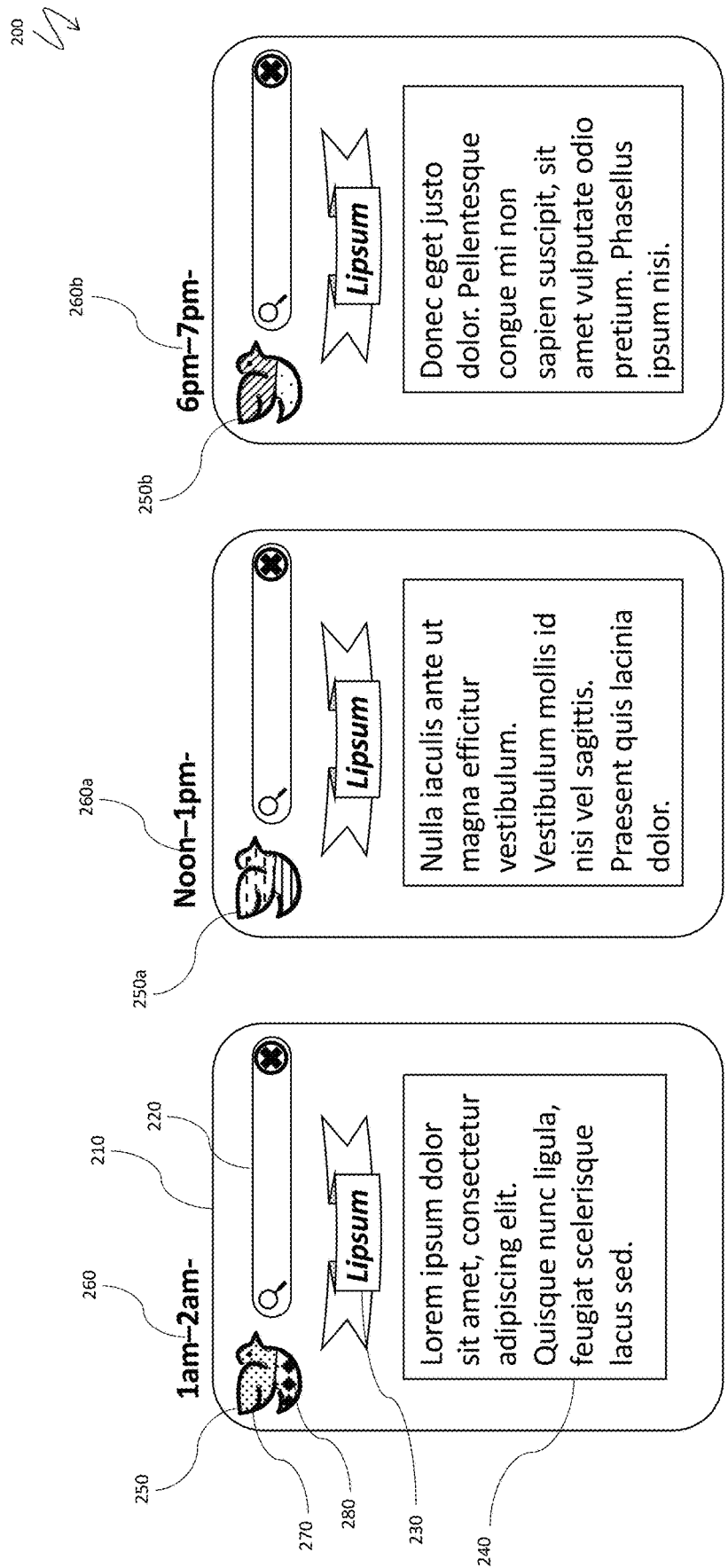
FIG. 2 is a schematic illustration of a website with gradient color-coded hourly logos, according to an embodiment of the system described herein.

FIG. 2 is a schematic illustration 200 of a website with gradient color-coded hourly logos. A web page 210 with a search bar 220, page title 230 and page content 240 is carrying a gradient color-coded logo 250 with a two-component gradient color scheme 270, 280. The color-coded logo 250 changes appearance according to a gradient type within a time interval 260. Subsequently, base colors for gradient changes are altered each hour, as shown by revised visual logo instances 250a, 250b at different time intervals 260a, 260b.

Figure 3:
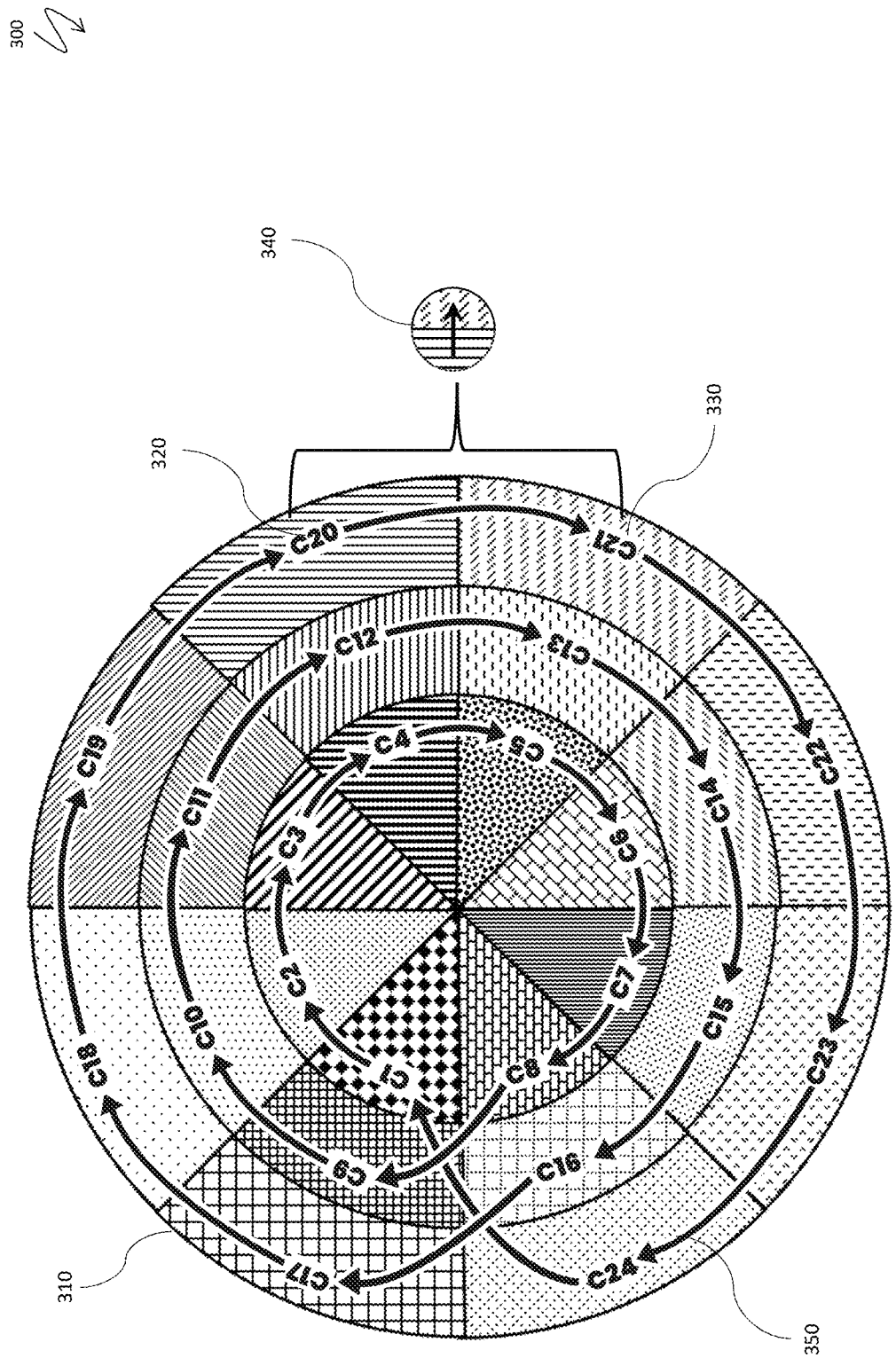
FIG. 3 is a schematic illustration of a circular gradient sequence for visual hourly coding (color/pattern), according to an embodiment of the system described herein.

FIG. 3 is a schematic illustration 300 of a circular gradient sequence for visual hourly coding (color/pattern). A color/pattern wheel 310 is schematically subdivided into twenty-four color/pattern segments (eight sectors by three segment each) to show construction of a visual coding graph (sequence of nodes). Hourly color (or pattern) marks 320 form a twenty-four hour sequence 350, as explained elsewhere herein (see, for example, Section 3 of the Summary). Adjacent colors 320, 330 form a two-component gradient scheme 340 for color changes from hour to hour (see Section 4(a) of the Summary).

Figure 4:
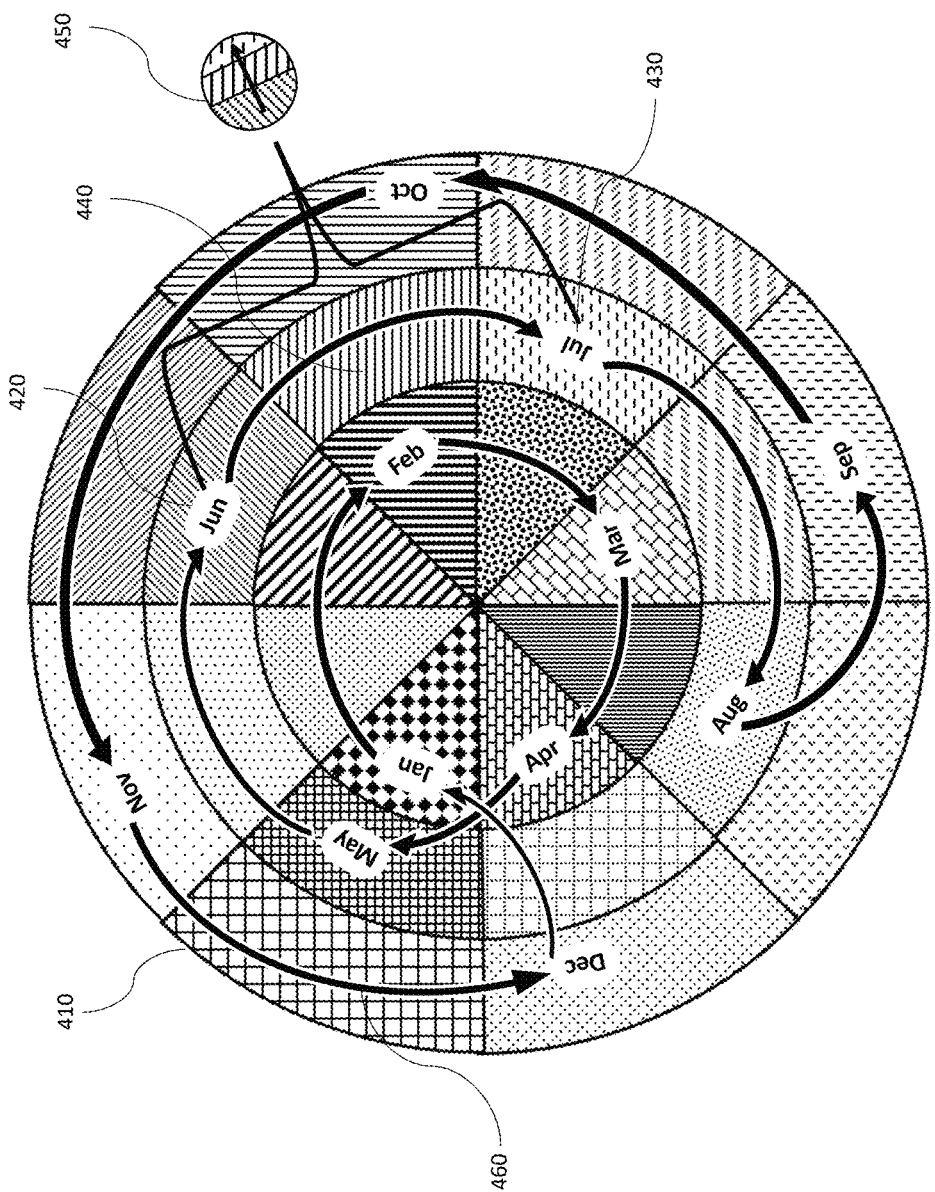
FIG. 4 is a schematic illustration of a circular gradient sequence for visual monthly coding, according to an embodiment of the system described herein.

FIG. 4 is a schematic illustration 400 of a circular gradient sequence for visual monthly coding. Like in FIG. 3, a color (pattern) wheel 410 is subdivided into twenty-four segments, and color (pattern) marks represent nodes 420, 430 of a visual coding graph, while transitions 460 between the nodes 420, 430 represent edges of the graph. FIG. 4 illustrates a three-component gradient color scheme, as explained in Section 4(b) of the Summary and elsewhere: each arc (edge) 460 drawn between adjacent months crosses three different color segments, as shown by the nodes 420, 430, and an intermediate segment 440, crossed by an edge between the nodes 420, 430, generates a three-component gradient color scheme 450.

Figure 5:
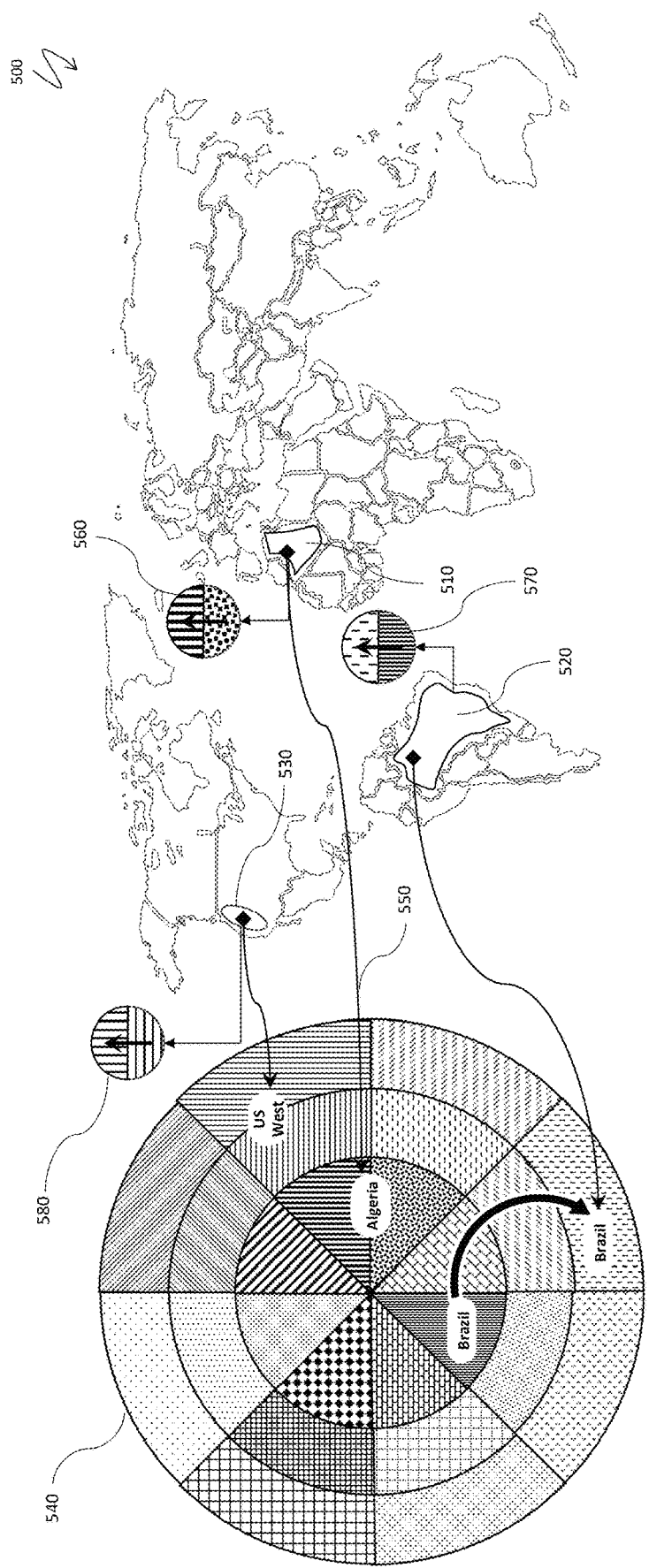
FIG. 5 is a schematic illustration of visual gradient coding for territorial objects, according to an embodiment of the system described herein.

FIG. 5 is a schematic illustration 500 of visual gradient coding for territorial objects. Three territorial objects: two countries—Algeria 510 and Brazil 520, and a region US West 530, are mapped on a color wheel 540, as shown by arrows 550. Each territory occupies a two-color area on the color wheel, generating two-component gradient color-coding schemes 560, 570, 580 used for visual coding. Note that the main colors in the two-component schemes may represent, for example, dominant seasonal colors in each territory, as well as colors of national flags, or other important or symbolic colors.

Figure 6:
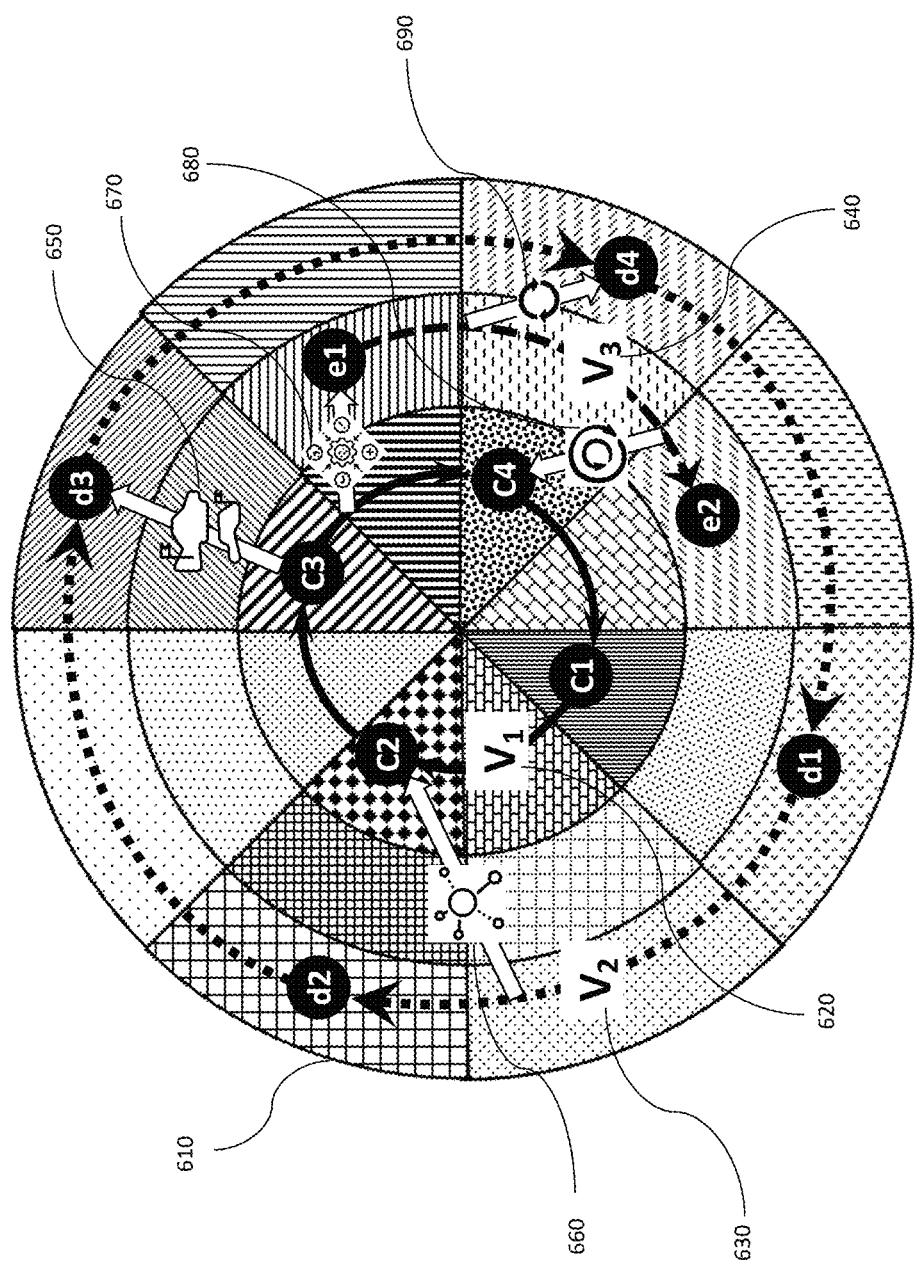
FIG. 6 is a schematic illustration of a visual coding graph with alternative cyclic and acyclic gradient sequences, according to an embodiment of the system described herein.

FIG. 6 is a schematic illustration 600 of a visual coding graph with alternative cyclic and acyclic gradient sequences (see Section 10 of the summary for examples and applications of such visual coding graphs). A color/pattern wheel 610 carries a three-part visual coding graph. The three parts of the node set of the graph include two cyclic gradient sequences 620, 630, each containing four nodes ($c_1$-$c_4$, $d_1$-$d_4$), and an acyclic gradient sequence 640 with two nodes $e_1$-$e_2$. Each of the two cyclic sequences generates a three-component gradient color coding scheme similar in construction and functioning to the scheme explained in FIG. 4. For example, the sequences 620, 630 may implement two alternative visual coding designs for the four seasons. The acyclic component is another three-component gradient color coding scheme, which may be used, for example, for visual coding of a Halloween theme morphing into a Thanksgiving theme.

Periodic switching between the three visual coding alternatives is provided by five special edges 650, 660, 670, 680, 690 of the visual coding graph. The special edges 650-690 representing switching conditions, which are continuously verified and, when necessary, executed by the system.

Figure 7:
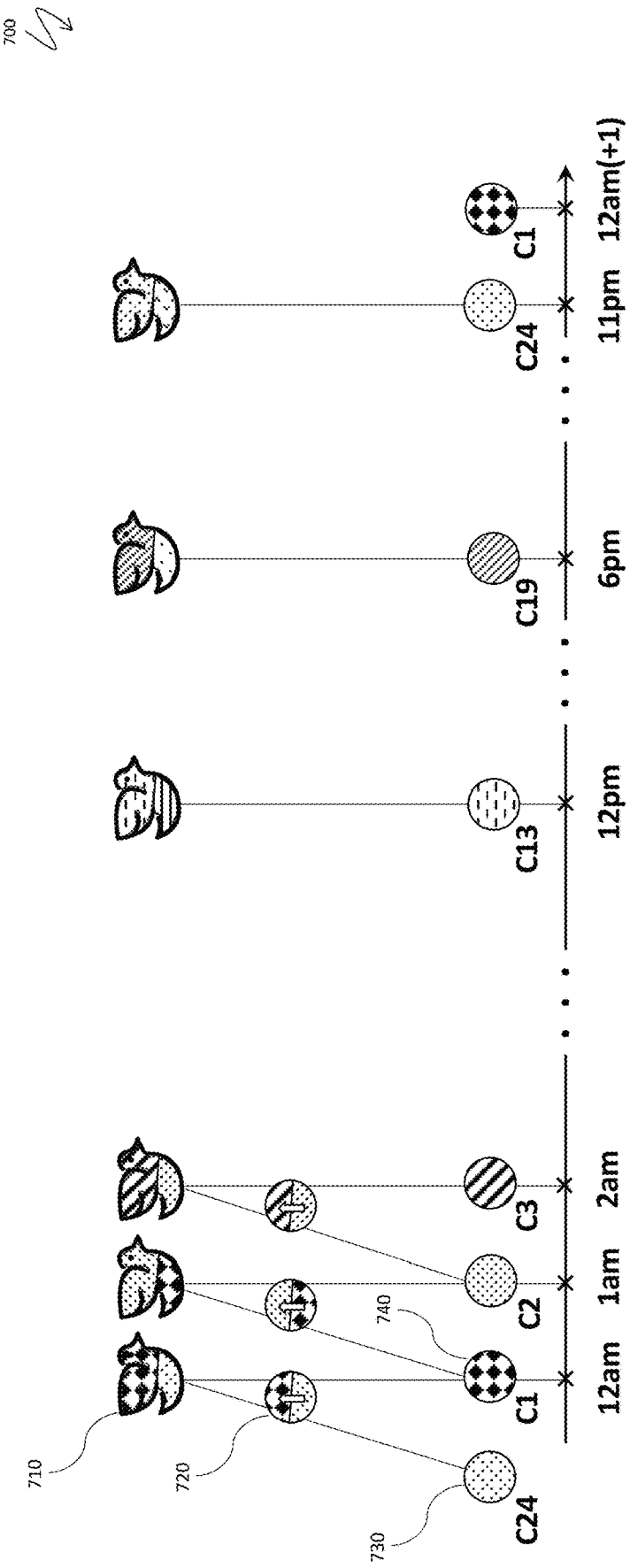
FIG. 7 is a schematic illustration of temporal gradient coding of hourly logos, according to an embodiment of the system described herein.

FIG. 7 is a schematic illustration 700 of temporal gradient coding of hourly logos. A page logo 710 has a two-component gradient color 720, changing each hour according to the visual coding graph of FIG. 3, where a color of the previous hour 730 and a color of the current hour 740 correspond to the nodes $c_1, \ldots, c_{24}$ of the twenty-four hour sequence 350 in FIG. 3.

Figure 8:
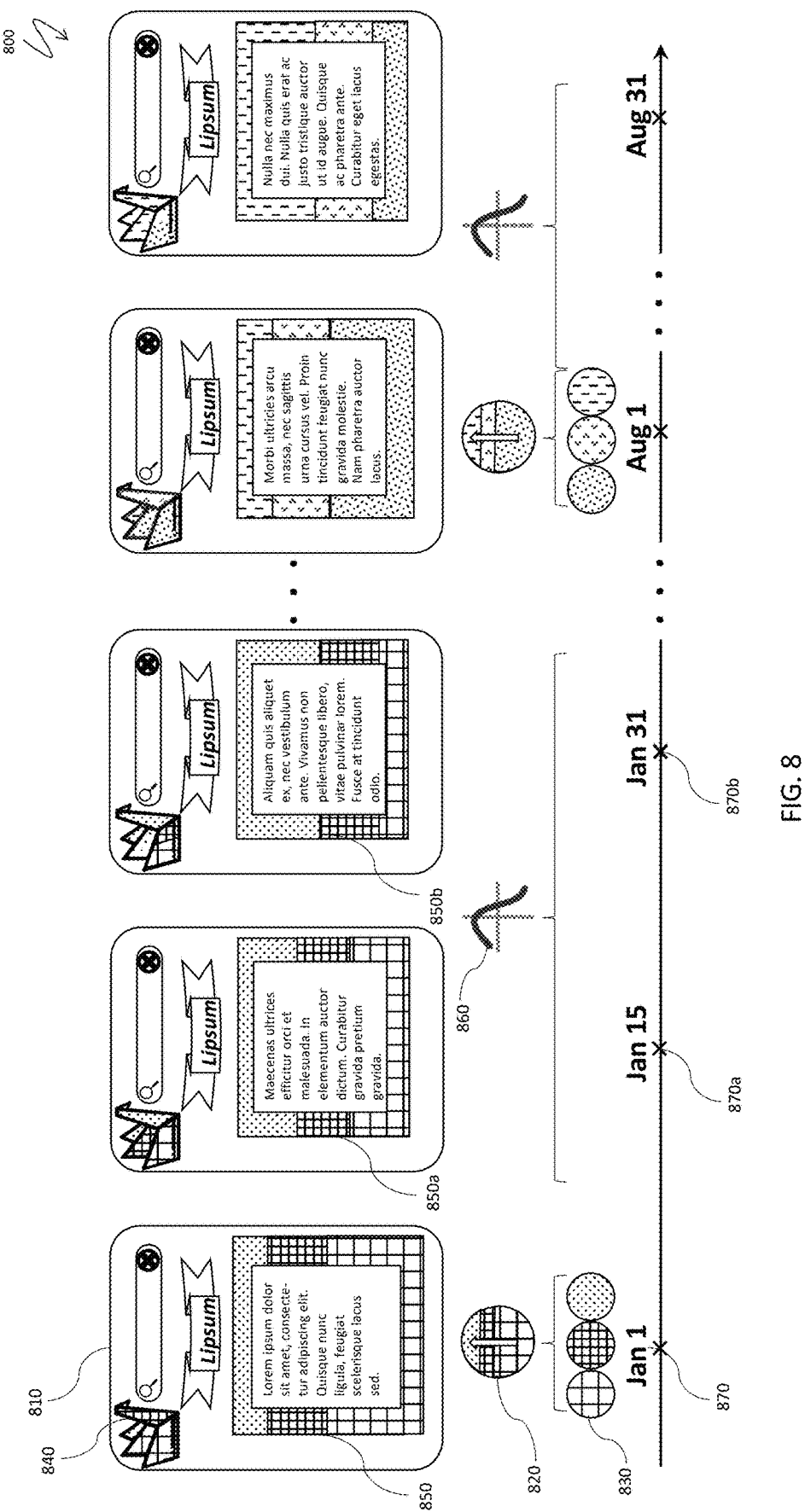
FIG. 8 is a schematic illustration of a website with dynamic gradient color-coded monthly content, according to an embodiment of the system described herein.

FIG. 8 is a schematic illustration 800 of a website with dynamic gradient color-coded monthly content. Selected sections of a web page 810—in this example, a logo 840 and a text pane 850, are color-coded according to a three-component gradient color scheme 820 with component colors 830. The coding retains the same color scheme for a month but the actual color palette of each selected section is continuously changing, as explained below.

The month of January is represented in FIG. 8 by three daily states 870, 870a, 870b; the gradient colors of the logo and the text pane are changing according to a graph 860, showing the dynamic size of three variable application areas for the gradient scheme as a percent of the web component size. Thus, at the start of the month marked by a timestamp 870, the leftmost color of the component colors 830 occupies 50% of the height of the text pane 850, the next color takes 30% of the height, and the third color occupies the remaining 20% of the height of the text pane 850. The color mix is processed through a gradient transition and shows the factual color palette of the text pane 850.

In the middle of the month, marked by the timestamp 870a, the dimensions of three-color application areas (for the three-component color scheme 820, 830) within a pane 850a are altered according to the values on the graph 860 and occupy equal portions of one third of the pane height, which leads to a modified gradient color palette with the same base colors. Finally, at the end of the month (the timestamp 870b) the dimensions of the color application areas are mirrored: the rightmost color of the component colors 830 occupies the top 50% of the text pane 850b, the next to left color takes 30%, and the right most color takes the remaining 20%.

Figure 9:
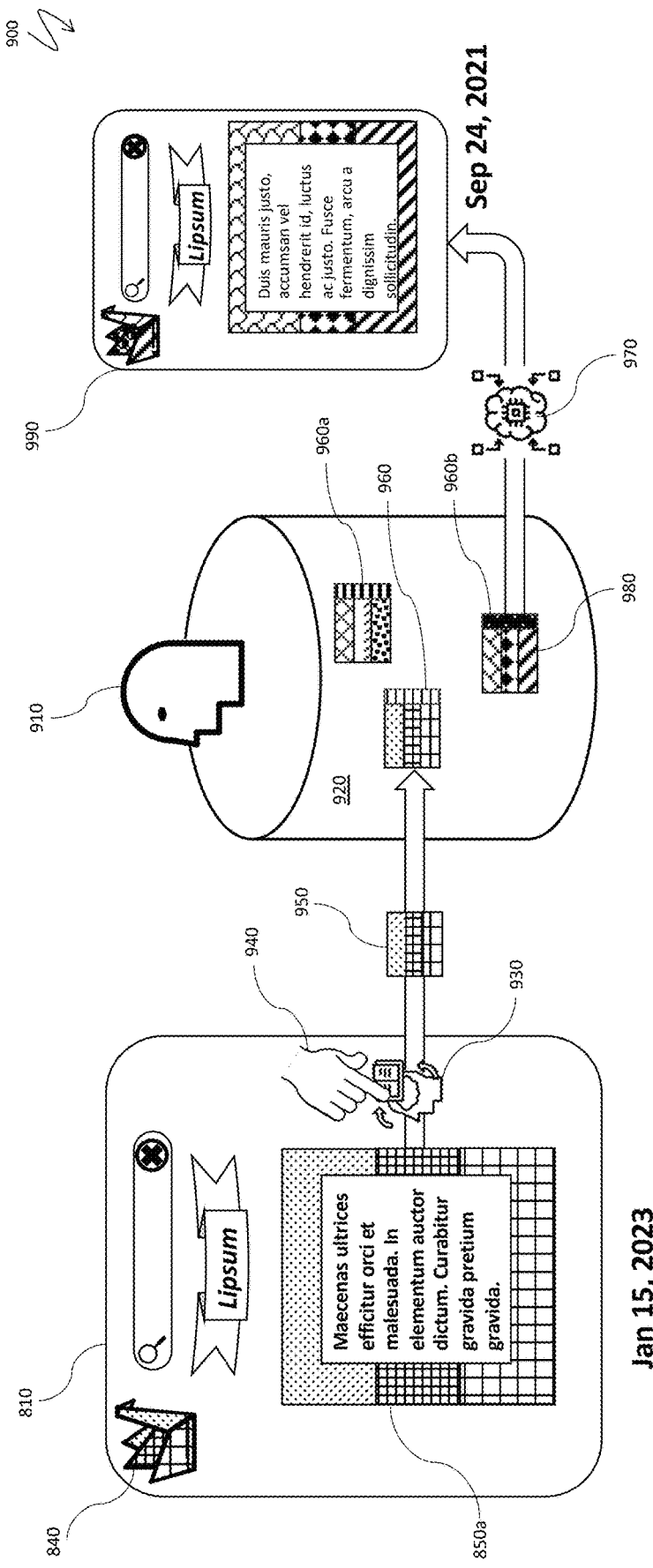
FIG. 9 is a schematic illustration of capturing visually coded page content by a user, according to an embodiment of the system described herein.

FIG. 9 is a schematic illustration 900 of capturing visually coded page content by a user 910. The user 910 may capture items of an entire web page or only a portion of a web page. Following the notations of FIG. 8 for the mid-January status of the page 810 with the logo 840 and the text pane 850a, the text pane 850a on the page 810 can be saved by the user 910 who may accumulate saved content in a repository 920, saved according to (and subsequently indexed by) color codes of the content, which the user 910 may memorize to facilitate retrieval. To this end, the page 810 is supplied with a content saving button 930. When the user actuates the button 930, as shown by an item 940, the system creates a color shortcut 950, which is a snapshot of the color code of the pane, and adds the shortcut 950 to the repository 920 with a copy of (or a reference to) the current content of the pane 850a and with an optional extra attribute 960, which reflects color-coding of the age of a repository item and may, for example, darken with the growing storage time in the repository, as shown by a pair of items 960a, 960b. Note that any appropriate user-actuatable mechanism may be used in place of the button 930, such as a gesture, including a touch gesture (e.g., tap and hold one or more captured objects), a voice command or some other user-actuatable mechanism. It is also possible for the user 910 to add additional searchable information, such as keywords, along with the extra attribute 960. The user 910 may be prompted for the additional information.

Subsequently, the user 910 may retrieve the items from the repository 920, as symbolized by a retrieval icon 970, by scrolling through visual shortcuts, choosing a necessary shortcut 980 based on the color memory of the user 910 and potentially assisted by the age attribute, discussed above, where the items 960a, 960b indicate darkening with age, and obtain desired page content 990 by, for example, clicking a desired one of the visual shortcuts to display the desired page content 990 and/or download the desired page content 990. The visual shortcuts may be associated with URLs that facilitate accessing corresponding page content. In some instances, the user may sort the visual shortcuts either by color/color combination or possibly by keyword or other additional information provided with the visual shortcuts.

Figure 10:
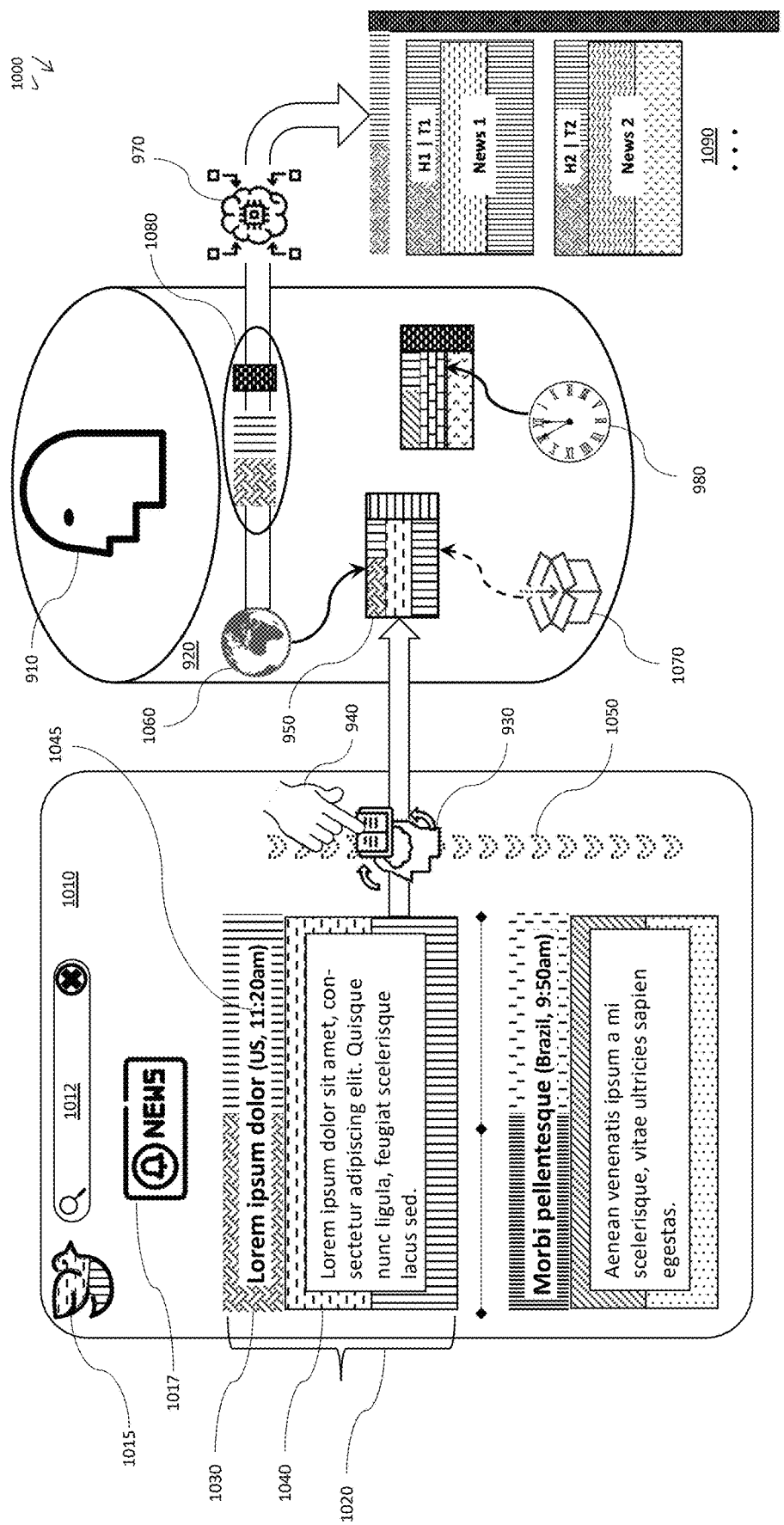
FIG. 10 is a schematic illustration of a visually coded news page with user capturing and categorized visually coded retrieval of saved news, according to an embodiment of the system described herein.

FIG. 10 is a schematic illustration 1000 of a visually coded international news page with the user 910 capturing and categorized visually coded retrieval of saved news. A news page 1010 with a search bar 1012, a visually coded logo 1015 (see, for example, FIG. 7 for more detail), and a title 1017 displays a collection of news items 1020. Each of the news items 1020 has a heading 1030 visually (color) coded according to a territory (country, region, continent, etc.), whereas the body 1040 of each of the news items 1020 item may be color-coded temporally per a time stamp 1045 (see FIGS. 3, 4, 7, 8 and the accompanying texts in conjunction with the temporal coding). In addition, visual coding may extend to a news subject area (not shown in FIG. 10).

The user 910 capturing and retrieving news items 1020 is analogous to the process explained in FIG. 9: the user 910 may store selected the news items 1020 in the individual or shared repository 920. Capturing may be provided by the button 930, activated by the user 910 as shown by the item 940 (which may apply to a touch screen or indicate mouse-clicking on the button 930). The button 930 may be automatically following page scrolling and aligning with a current top item or may be relocated by the user, as shown by an item 1050.

The color shortcut 950 in FIG. 10 is analogous to the color shortcut 950 in FIG. 9. Additionally, FIG. 10 shows extended categorization of saved items by three categories: the shortcut 980 that is temporal, a territorial shortcut 1060, and a content shortcut 1070 (association with the captured content is shown by the dashed arrow). Based on existing categorization, the user 910 may build a query 1080 for the content retrieval operation, as symbolized by the retrieval icon 970, and retrieve stored items 1090 satisfying the query 1080 (category values for the query 1080 are repeated in the top horizontal bar and right vertical bar of results 1090).

Figure 11:
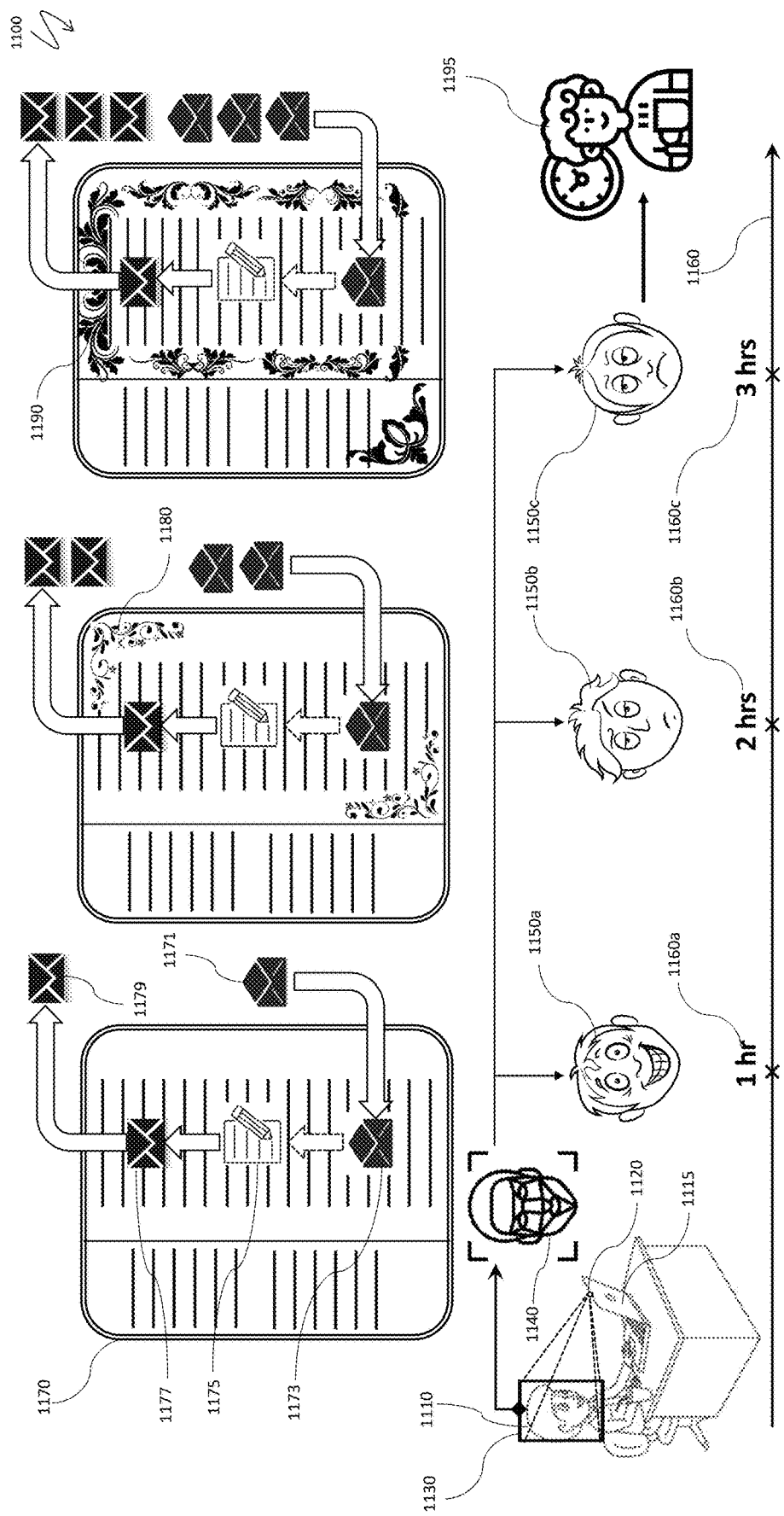
FIG. 11 is a schematic illustration of a visual ornamental coding of activities employing non-verbal cues, according to an embodiment of the system described herein.

FIG. 11 is a schematic illustration 1100 of a visual ornamental coding of activities employing non-verbal cues. A user 1110 is receiving, processing, writing, and sending emails using a notebook computer 1115, supplemented with a front camera 1120, which continuously captures a face of the user 1110 in video frames 1130 and streams the frames 1130 into a facial recognition component 1140 of the system. The facial recognition component 1140 assesses emotional states 1150a, 1150b, 1150c of the user 1110, shown in FIG. 11 at three subsequent hourly marks 1160a, 1160b, 1160c on a timeline 1160.

Operations of the user 1110 in an email pane 1170 include receiving incoming email 1171, processing email 1173, writing email, including responses to some received email 1175, sending email 1177, and periodically checking a stream of outgoing emails 1179. After a first hour of work, at the timestamp 1160a, the emotional state 1150a of the user 1110 is enthusiastic. The user state 1150b after an additional hour of work at the time 1160b starts looking slightly tired and bored. The system reacts to the change of user state with a visually coded warning, adding a light ornamental background 1180 to the email pane. In this example, the user 1110 continues working on the email and gets overwhelmed with a cumulative amount of work by the end of the third hour at the timestamp 1160c, which is clearly indicated by the emotional state 1150c. At this point, the system changes the notification to a dense ornament 1190, covering the background of the email pane 1170 and sending the user 1110 to a mandatory break 1195.

Figure 12:
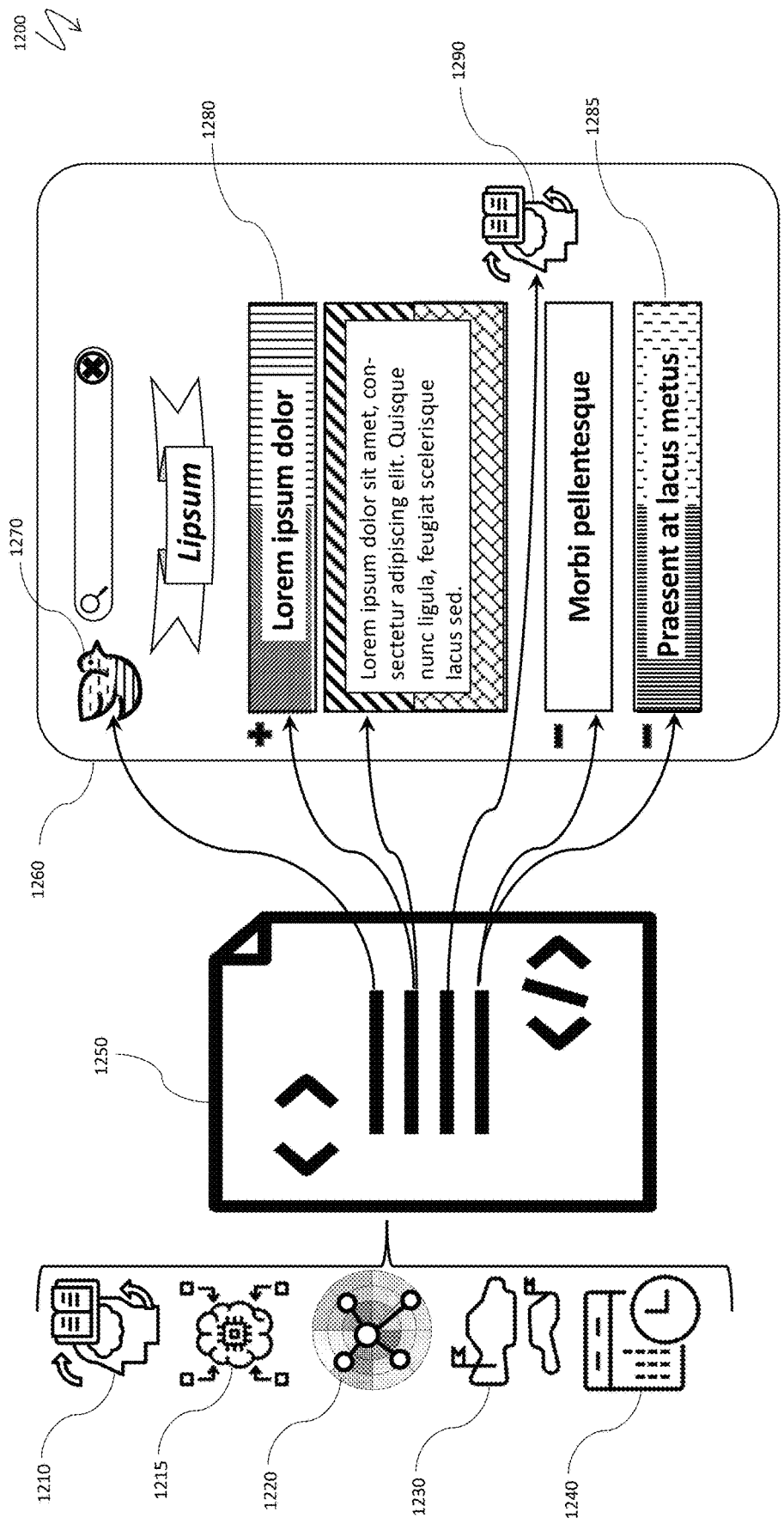
FIG. 12 is a schematic illustration of applying visual coding behaviors to web objects and user interfaces, according to an embodiment of the system described herein.

FIG. 12 is a schematic illustration 1200 of applying visual coding behaviors to web objects and user interfaces. Various aspects and components of visual coding techniques, explained elsewhere herein, such as tools for memorizing and retrieving visually coded content 1210, 1215, visual coding graphs 1220, switching conditions 1230 used in visual coding graphs (see FIG. 6 and the accompanying text), schedules 1240 used in execution and planning of visual coding schemes and associated events, and other components not shown in FIG. 12, may be implemented as a set of scripts 1250. Subsequently, the set of scripts 1250 may be attached to different portions and objects of a web or application page 1260, including page logos and other images 1270, expanded and collapsed content panels 1280, 1285, interactive content capturing tools 1290, etc. Such attachments create visual coding behaviors for the associated portions and objects, as explained in more detail elsewhere herein.

Referring to FIG. 13, a system flow diagram 1300 illustrates system functioning in connection with visual coding and associated user interfaces. Processing begins at a step 1310, where a visual coding theme is defined (see Section 8 of the Summary for more detail). After the step 1310, processing proceeds to a step 1312, where visual coding tools, such as color, ornament, or filling, are chosen. After the step 1312, processing proceeds to a step 1315, where variable factors of visual coding, such as temporal, territorial, activity, or event-driven, are selected. After the step 1315, processing proceeds to a step 1320, where the visual coding targets, such as objects and/or portions of a web or an application page, are chosen. After the step 1320, processing proceeds to a step 1322, where application areas and switching conditions for visual coding graphs are defined, as explained elsewhere herein (see, for example, FIGS. 6, 8 and the accompanying texts for details). After the step 1322, processing proceeds to a step 1325, where graphical training materials, such as photographs and illustrations, are collected. After the step 1325, processing proceeds to a step 1330, where color features of the training materials are extracted. After the step 1330, processing proceeds to a step 1332, where machine learning and optimization of visual coding graph(s) is performed.

After the step 1332, processing proceeds to a test step 1335, where it is determined whether the visual coding graph(s) are using color coding. If so, processing proceeds to a step 1340, where color gradient charts are built, as explained elsewhere herein (see, among other, FIGS. 3-5, 7-8). After the step 1340, processing proceeds to a test step 1342, where it is determined whether gradient charts are area sensitive (see FIG. 8 and the accompanying text). (Note that the test step 1342 may be independently reached from the test step 1335 if it is determined that color coding is not required). If it is determined that the gradient charts are area sensitive, processing proceeds to a step 1345, where the gradient dynamics for application areas are applied, as explained in conjunction with FIG. 8. After the step 1345, processing proceeds to a step 1350, where visual coding behaviors are built for all objects (see FIG. 12 and the accompanying text). Note that the step 1350 may be independently reached from the test step 1342 if it is determined that area sensitive gradient color charts are not required. After the step 1350, processing proceeds to a step 1352, where user interactivity is built for visually coded objects. After the step 1352, processing proceeds to a step 1355, where visual coding behaviors and routines are attached to target objects. After the step 1355, processing proceeds to a step 1360, where components of the interactive user interface, built at the step 1352, are attached to target objects.

After the step 1360, processing proceeds to a step 1362, where a user initiates saving a visually coded object in a personal or shared repository (see FIGS. 9, 10 for more information). After the step 1362, processing proceeds to a step 1365, where the system creates a visual shortcut for the object. After the step 1365, processing proceeds to a step 1370, where the visual shortcut and a copy of (or a reference to) the captured visually coded object is added to the repository. After the step 1370, processing proceeds to a test step 1372, where it is determined whether the visual coding categories are present in the repository, as shown in FIG. 10. If so, processing proceeds to a step 1375, where the system builds a categorized description of the newly added object. After the step 1375, processing proceeds to an optional step 1380, where the age category is updated for all objects in the repository (note that the step 1380 may be independently reached from the test step 1372 if it is determined that visual coding categories are absent). After the step 1380, processing proceeds to a step 1382, where a user initiates retrieval of visually coded objects from the repository. After the step 1382, processing proceeds to a test step 1372, where it is determined whether the retrieval request is purely shortcut based (i.e., it does not include manipulation with categories). If so, processing proceeds to a step 1390, where the user locates visual shortcuts of the retrieved objects; otherwise, processing proceeds to a step 1392, where the user builds a categorized query for the visual codes of retrieved objects. After each of the steps 1390, 1392, processing proceeds to a step 1395, where object copies or references are retrieved from the repository. After the step 1395, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to notebooks, smartphones, tablets, and other mobile computers and on wearable devices. Smartphones and tablets may use operating system(s) selected from the group consisting of: iOS, Android OS, Windows Phone OS, Blackberry OS, and mobile versions of Linux OS. Notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for enhancing interactivity of a user with at least a portion of a web page, comprising:
    providing one or more visual codes for at least some items on the web page that are part of the portion of the web page, each of the visual codes corresponding to at least one of: temporal, geographical, content, activity, or behavior attributes of the at least some items;
    providing a user-actuatable mechanism on the web page to capture the portion of the web page and to create a visual code shortcut for each of the one or more of the visual codes corresponding to the portion of the web page;
    storing the portion of the web page in response to the user actuating the user-actuatable mechanism, the portion being stored in a repository that is indexed according to the one or more visual code shortcuts, the portion of the web page being retrievable from the repository at a later time by accessing at least one of the one or more visual code shortcuts;
    continuously capturing a face of the user to provide video frames;
    streaming the video frames into a facial recognition component;
    the facial recognition component assessing emotional states of the user; and
    adjusting the one or more visual codes based on a current emotional state of the user.

2. The method of claim 1, wherein the at least a portion of the web page is a news page.

3. The method of claim 2, wherein the news page displays a collection of news items and includes a search bar, a visually coded logo, and a title.

4. The method of claim 2, wherein the visual codes are color codes that correspond to at least one of: temporal information about the news page, territorial information corresponding to the news page, or content information corresponding to the news page.

5. The method of claim 1, wherein at least some of the items include photographs that are categorized by at least one of: temporal attributes, geographic attributes and territorial attributes.

6. The method of claim 5, wherein color sets are extracted from the photographs to form a training sample for a machine learning component and an optimization component that provide an optimal series of geotemporal color schemes for visual coding.

7. The method of claim 1, wherein the user provides additional searchable information to be stored with the one or more visual code shortcuts.

8. The method of claim 1, wherein the visual codes include a color scheme.

9. The method of claim 8, wherein the visual codes corresponding to the items of the portion of the web page that are stored include an age attribute that changes color in response to a passage of time.

10. The method of claim 8, wherein the at least some of the items of the portion of the web page that are stored are retrievable using the color scheme.

11. The method of claim 1, wherein at least some of the items of the portion of the web page that are stored are indexed by at least one of: one or more temporal visual code shortcuts, one or more territorial visual code shortcuts, or content visual code shortcuts.

12. The method of claim 1, wherein at least one of the items is a company logo placed on a web page.

13. The method of claim 1, wherein, in response to the current emotional state of the user being slightly tired and bored, a light ornamental background is added to a pane containing work being performed by the user.

14. The method of claim 13, wherein the light ornamental background is transformed to a dense ornament as the user continues to work.

15. The method of claim 14, wherein transforming the background to a denser ornament indicates to the user that it is time to take a break from the work being performed by the user.

16. The method of claim 15, wherein the work being performed by the user is halted to prevent the user from continuing.

17. The method of claim 1, wherein one or more scripts are implemented using at least one of: tools for memorizing and retrieving visually coded content, visual coding graphs, switching conditions used in visual coding graphs, and schedules used in execution and planning of visual coding schemes and associated events.

18. The method of claim 17, wherein the one or more scripts are programmatically attached to at least some items on the web page and create visual coding behaviors for the at least some items on the web page.

19. A method for enhancing interactivity of a user with at least a portion of a web page, comprising:
providing one or more visual codes for at least some items on the web page that are part of the portion of the web page, each of the visual codes corresponding to at least one of: temporal, geographical, content, activity, or behavior attributes of the at least some items;
providing a user-actuatable mechanism on the web page to capture the portion of the web page and to create a visual code shortcut for each of the one or more of the visual codes corresponding to the portion of the web page; and
storing the portion of the web page in response to the user actuating the user-actuatable mechanism, the portion being stored in a repository that is indexed according to the one or more visual code shortcuts, the portion of the web page being retrievable from the repository at a later time by accessing at least one of the one or more visual code shortcuts, wherein the one or more visual codes include changing color schemes and colors within color schemes based on a passage of time and wherein a particular color scheme for the one or more visual codes at a particular time is chosen based on a circular gradient sequence for visual hourly color coding.

20. The method of claim 19, wherein a plurality of additional visual coding alternatives are used and wherein changes between the plurality of the additional visual coding alternatives are cyclic or acyclic.

21. The method of claim 20, wherein particular ones of the changes between the plurality of the visual coding alternatives are chosen based on switching conditions that are continuously verified.

22. A method for enhancing interactivity of a user with at least a portion of a web page, comprising:
providing one or more visual codes for at least some items on the web page that are part of the portion of the web page, each of the visual codes corresponding to at least one of: temporal, geographical, content, activity, or behavior attributes of the at least some items;
providing a user-actuatable mechanism on the web page to capture the portion of the web page and to create a visual code shortcut for each of the one or more of the visual codes corresponding to the portion of the web page; and
storing the portion of the web page in response to the user actuating the user-actuatable mechanism, the portion being stored in a repository that is indexed according to the one or more visual code shortcuts, the portion of the web page being retrievable from the repository at a later time by accessing at least one of the one or more visual code shortcuts, wherein the one or more visual codes include changing color schemes and colors within color schemes based on a passage of time and wherein a particular color scheme for the one or more visual codes at a particular time is chosen based on a circular gradient sequence for visual monthly color coding.

23. The method of claim 22, wherein a plurality of additional visual coding alternatives are used and wherein changes between the plurality of the additional visual coding alternatives are cyclic or acyclic.

24. The method of claim 23, wherein particular ones of the changes between the plurality of the visual coding alternatives are chosen based on switching conditions that are continuously verified.

25. A non-transitory computer readable medium containing software that enhances interactivity of a user with at least a portion of a web page, the software comprising:
executable code that provides one or more visual codes for at least some items on the web page that are part of the portion of the web page, each of the visual codes corresponding to at least one of: temporal, geographical, content, activity, or behavior attributes of the at least some items;
executable code that provides a user-actuatable mechanism on the web page to capture the portion of the web page and to create a visual code shortcut for each of the one or more of the visual codes corresponding to the portion of the web page; and executable code that stores the portion of the web page in response to the user actuating the user-actuatable mechanism, the portion being stored in a repository that is indexed according to the one or more visual code shortcuts, the portion of the web page being retrievable from the repository at a later time by accessing at least one of the one or more visual code shortcuts, wherein the one or more visual codes include changing color schemes and colors within color schemes based on a passage of time and wherein a particular color scheme for the one or more visual codes at a particular time is chosen based on a circular gradient sequence for either visual hourly color coding or visual monthly color coding.

26. The non-transitory computer readable medium of claim 25, wherein a plurality of additional visual coding alternatives are used and wherein changes between the plurality of the additional visual coding alternatives are cyclic or acyclic.

* * * * *